(12) United States Patent
Torres San Juan et al.

(10) Patent No.: US 10,219,524 B2
(45) Date of Patent: Mar. 5, 2019

(54) MOISTURE-RESISTANT EDIBLE FOOD COATING AND METHOD FOR APPLYING THE SAME

(71) Applicant: DAWN FOOD PRODUCTS, INC., Jackson, MI (US)

(72) Inventors: Julio Alberto Torres San Juan, Denver, CO (US); Jane L. Kutner, Denver, CO (US); Juan Gabriel Gonzalez Juarez, Guadalupe (MX); Miles Elton Jones, Clarklake, MI (US); Rolando Jesus Alanis Villarreal, Guadalupe (MX)

(73) Assignee: DAWN FOOD PRODUCTS, INC., Jackson, MI (US)

( * ) Notice: Subject to any disclaimer, the term of this patent is extended or adjusted under 35 U.S.C. 154(b) by 66 days.

(21) Appl. No.: 15/113,495

(22) PCT Filed: Jul. 21, 2014

(86) PCT No.: PCT/US2014/047434
§ 371 (c)(1),
(2) Date: Jul. 22, 2016

(87) PCT Pub. No.: WO2015/112193
PCT Pub. Date: Jul. 30, 2015

(65) Prior Publication Data
US 2017/0006881 A1 Jan. 12, 2017

Related U.S. Application Data

(60) Provisional application No. 61/930,212, filed on Jan. 22, 2014.

(51) Int. Cl.
| | |
|---|---|
| A23L 1/00 | (2006.01) |
| A23G 3/34 | (2006.01) |
| A23G 3/54 | (2006.01) |
| A23P 20/10 | (2016.01) |
| A23P 20/18 | (2016.01) |
| A23L 29/212 | (2016.01) |
| A23L 29/225 | (2016.01) |
| A21D 13/26 | (2017.01) |
| A21D 13/60 | (2017.01) |
| A21D 13/28 | (2017.01) |

(52) U.S. Cl.
CPC ............. *A23G 3/343* (2013.01); *A21D 13/26* (2017.01); *A21D 13/28* (2017.01); *A21D 13/60* (2017.01); *A23G 3/0089* (2013.01); *A23G 3/54* (2013.01); *A23L 29/212* (2016.08); *A23L 29/225* (2016.08); *A23P 20/10* (2016.08); *A23P 20/105* (2016.08); *A23P 20/18* (2016.08); *A23V 2002/00* (2013.01)

(58) Field of Classification Search
CPC ............................ A23L 29/262; A23P 20/105
USPC ............................ 426/94, 658, 660, 573, 592
See application file for complete search history.

(56) References Cited

U.S. PATENT DOCUMENTS

| | | | |
|---|---|---|---|
| 3,471,303 A | | 10/1969 | Hamdy et al. |
| 6,723,363 B2 | | 4/2004 | Ziegler et al. |
| 2008/0145493 A1 | * | 6/2008 | Myers et al. |
| 2008/0265055 A1 | * | 10/2008 | Quan et al. |
| 2011/0236537 A1 | | 9/2011 | Zhong et al. |

FOREIGN PATENT DOCUMENTS

EP 0090559 A2 10/1983

OTHER PUBLICATIONS

International Search Report and Written Opinion, International Application No. PCT/US2014/047434, dated Sep. 29, 2014, 10 pages.
Extended European Search Report, European Application No. 14879925.7-1656, dated Nov. 15, 2017, 8 pages.

* cited by examiner

*Primary Examiner* — Helen F Heggestad
(74) *Attorney, Agent, or Firm* — Barnes & Thornburg LLP

(57) ABSTRACT

This disclosure is directed to a moisture-resistant edible food coating composition that comprises a polymer and an organic solvent, and a method for applying the same. The claimed edible coating has a reduced viscosity which enables more efficient application of the coating to a bakery product, reduces surface blemishes or textural defects on a frozen bakery product, and permits the frozen bakery product to show a fresh, "ready-to-eat" appearance upon thawing that will extend the shelf life and enhance the commercial value of the bakery product.

44 Claims, No Drawings

MOISTURE-RESISTANT EDIBLE FOOD COATING AND METHOD FOR APPLYING THE SAME

CROSS REFERENCE TO RELATED APPLICATIONS

This application is a national stage entry under 35 USC § 371(b) of International Application No. PCT/US2014/047434, filed Jul. 21, 2014, which claims priority under 35 U.S.C. § 119(e) to U.S. Provisional Patent Application Ser. No. 61/930,212 filed Jan. 22, 2014, the entire disclosures of both of which are hereby expressly incorporated by reference.

TECHNICAL FIELD

The present disclosure relates to an edible food coating composition that inhibits moisture migration of frozen food bakery products and methods of applying the same.

BACKGROUND

The shelf-life and commercial viability of frozen food products, and particularly frozen frosted bakery products, is often predicated on their resistance to develop visual and tactile imperfections such as dulling, stickiness, and chipping after thawing. Although these blemishes do not create health risks or significantly influence the taste of the bakery product, their unappetizing appearance often dissuades potential buyers. For example, frozen frosted bakery products often experience rapid surface wetting or dehydration due to moisture migration that affects the texture, stickiness, and shine of products when thawed.

Although known in the confectionary industry, edible coatings have not been widely used in the baking industry. In particular, edible coatings for use on frozen bakery products have not been widely adopted because the application of an edible coating to a fresh bakery substrate, such as a doughnut, prior to freezing has specific disadvantages. Freezing and thawing of a fresh bakery product causes the product to contract and expand, respectively, due to the temperature changes. As a result of the surface tensions caused by the temperature gradient created during production of frozen bakery products, textural defects, such as cracks, hair lines, and condensation, are often observed on the product's surface after final thawing.

Further, thawed bakery products seldom retain the fresh, "ready-to-eat" look of their freshly made counterparts. Thus, an edible coating for frosted bakery products that provides flexible tolerance of freeze/thaw cycles to reduce the formation of cracks, hair lines, and condensation while also maintaining a competitive "ready-to-eat" appearance after thawing is desirable.

SUMMARY OF THE INVENTION

The present disclosure is directed to an edible food coating composition that comprises a polymer, an organic solvent, and has a viscosity ranging from 12 cPs to 16 cPs. The polymer of the edible food coating may be Hydroxypropylcellulose (HPC) or Ethyl cellulose (EC). The polymer may comprise about 3% of the coating. The organic solvent of the edible food coating may be ethyl alcohol. The organic solvent may comprise about 97% of the coating. The viscosity of the edible food coating may be about 14 cPs.

The present disclosure is also directed to a food product comprising a substrate that includes flour, sugar, fat, and water; a frosting in contact with the substrate; and an edible coating in contact with the frosting. The food product may be a bakery product. The bakery product may be a doughnut. The doughnut may be a yeast doughnut or a cake doughnut. The cake doughnut may be an old-fashioned cake doughnut. The yeast doughnut may be chocolate-frosted or glazed. The old-fashioned cake doughnut may be glazed or unglazed.

The edible food coating of the food product may comprise from about 1% to about 30% of polymer, from about 70% to about 99% of organic solvent, and a viscosity from about 12 cPs to about 16 cPs. The polymer of the edible food coating of the food product may be Hydroxypropylcellulose (HPC) or Ethyl cellulose (EC). They polymer may also comprise about 3% of the coating. The organic solvent of the edible food coating of the food product may be ethyl alcohol. The organic solvent may also comprise about 97% of the coating. The viscosity of the edible food coating of the food product may be about 14 cPs.

The present disclosure is also directed to a method of applying the edible food coating of the food product to the food product. The method comprises preparing the edible food coating and advancing the coating through at least one nozzle so as to spray the food coating onto the food product. The at least one nozzle may be an ultrasonic nozzle. The ultrasonic nozzle may be a 25 kHz impact nozzle. The method may further comprise (i) a Box 1 and a Box 2 flow rate of about 50 ml/min, (ii) a Box 1 and a Box 2 jet force of about 55 LPM, (iii) a nozzle power of about 10 watts, (iv) a jet position from tip to food product of about 6 inches, (v) a spray on of about 1 inch, and (vi) a spray off of about 20 inches.

The present disclosure is also directed to a method of preparing a coated food product. The method comprises preparing the edible food coating of the food product and passing the food coating through at least one spray nozzle so as to spray the food coating onto the food product to create a coated food product. The at least one nozzle of the method may be an ultrasonic nozzle. The ultrasonic nozzle may be a 25 kHz impact nozzle. The method may further comprise (i) a Box 1 and a Box 2 flow rate of about 50 ml/min, (ii) a Box 1 and a Box 2 jet force of about 55 LPM, (iii) a nozzle power of about 10 watts, (iv) a jet position from tip to food product of about 6 inches, (v) a spray on of about 1 inch, and (vi) a spray off of about 20 inches.

In addition, the method of preparing a coated food product comprises freezing the coated food product and storing the frozen coated food product for a period of time. The freezing may occur at core temperatures from about −8° C. to about −20° C. and at a relative humidity of about 55% to about 85%. The method of preparing a coated food product may further comprise thawing the coated food product after the period of time.

The low viscosity of the edible coating composition described herein enables more efficient application of the coating to a frozen, frosted bakery substrate. Application of the edible coating allows the frozen, frosted bakery substrate to better tolerate freeze/thaw cycles. As such, the coated, frosted bakery substrate shows reduced surface blemishes or textural defects, such as cracks, hair lines, and condensation once thawed. Ultimately, the edible coating described herein permits a frozen, frosted bakery product to show a fresh, "ready-to-eat" appearance upon thawing that will extend the shelf life and enhance the commercial value of the bakery product.

DETAILED DESCRIPTION OF THE INVENTION

The present disclosure is directed to an edible coating composition for frosted bakery products that inhibits imperfections such as cracks, hair lines, condensation, dullness, stickiness, and chipping due to moisture migration in frozen frosted bakery products after thawing. In addition, the edible food coating described herein has a reduced viscosity to enable more efficient, uniform, and conservative application to food products, such as frosted bakery products. As applied to a frosted bakery product, the edible coating composition acts as a barrier to moisture and humidity, to prevent dehydration or rehydration. Thus, the edible coating improves the product's flexibility and durability of different atmospheric conditions due to freezing and thawing.

Additionally, the edible coating disclosed herein prevents the product's frosting from showing syneresis, or poor stability, during and/or after thawing. The edible coating also improves the aesthetic appeal of the frozen frosted bakery product. In fact, the coating permits the bakery product to show a similarly fresh appearance when thawed as compared to its freshly-made counterparts. Further, this disclosure relates to a method of applying the edible coating to frosted bakery products that promotes a fresh, "ready-to-eat" appearance that will extend the shelf life and enhance the commercial value of the bakery products.

A food product of the present disclosure may be a bakery product or a bakery substrate that may be edible. The bakery substrate, as used herein, is a substance that may include flour, sugar, fat, and water. For example, the bakery product may be a yeast doughnut or a cake doughnut. The bakery product may also be frozen, for example, a frozen yeast doughnut or a frozen cake doughnut. It should also be understood that other components may be present in the bakery product or substrate (e.g., fruit, nuts, berries, filling, chocolate, etc.).

A food product of the present disclosure may also include a frosting or glaze that includes sugar, fat, and water. The frosting or glaze may be in contact with the bakery substrate such as being disposed upon the substrate to produce the frosted bakery product. As such, the term "glaze" or "frosting" as used herein is a sugar containing component that is disposed onto the bakery product or substrate to produce a frosted bakery product. While the phrase "frosted bakery product" may be used to generally describe both a glazed bakery product or a frosted bakery product throughout this disclosure, it should be noted that the bakery substrate with a glaze disposed thereon will result in one type of bakery product (e.g., glazed bakery product), while the bakery substrate with a frosting disposed thereon will result in another type of bakery product (e.g., frosted bakery product).

The invention disclosed herein may be utilized with a wide variety of bakery products and frosted bakery products. Although the following description is primarily directed to doughnuts, there is no intent to limit the invention to this particular bakery product. Other types of bakery substrates or bakery products which may be used in the present invention include, but are not limited to, cake, cookies, brownies, muffins, cupcakes, and pastries.

As indicated above, frozen food products, and particularly frozen frosted bakery products, can be affected by the relative humidity of their atmospheric conditions. For example, moisture transfer within food products is a factor in determining the food product's quality. Temperature fluctuations created by changing atmospheric conditions during the shelf life of the frozen frosted bakery product can result in moisture migration between a frozen food product and its atmosphere resulting in a temperature gradient within the food product. Moisture migration manifests in several forms including moisture loss by sublimation, moisture absorption and redistribution in food components, or recrystallization of ice due to drip loss during thawing. For example, when the atmospheric temperature decreases, moisture within the frozen food product migrates toward its surface or into the environment. Conversely, when the atmospheric temperature increases, water within the environment can be absorbed into the frozen food product surface.

An edible coating can be, for example, a transparent film of edible material formed as a layer that covers the food product. Edible coatings may be made from a variety of food ingredients like proteins (e.g., gelatin, casein, wheat gluten, zein, soy protein), lipids (e.g., beeswax, acetylated monoglycerides, fatty alcohols, fatty acids), and resins or polymers (e.g., polysaccharides).

Edible coatings have beneficial properties applicable to frozen food products including the ability to control dripping after thawing and to better manage the stickiness and fresh, "ready-to-eat" appearance after thawing. However, there are substantial hindrances to adopting these edible coatings for application to frozen frosted bakery products. For example, traditional confectionary coatings have a high viscosity and are easily applied to candies and confections with traditional application methods. Conversely, highly viscous edible coatings are much more difficult to uniformly apply to frosted bakery products. In addition, traditional confectionary coatings do not provide the necessary flexibility required to tolerate the expansion and contraction that occurs due to freezing temperatures and fluctuations during production and storage of a frozen frosted bakery product. To address these deficiencies, this disclosure is directed to an edible coating for frozen frosted bakery products that provides improved application capabilities and resistance to withstand atmospheric environmental conditions that may affect the product's commercial viability.

In addition to other components, common edible coatings typically include water or glycol, a polymeric binder, pigments, and additives. While no pigments were used, the composition of edible coating described herein includes a polysaccharide as the polymeric binder.

A polysaccharide is a polymeric carbohydrate molecule. The polysaccharide binder of the edible coating described herein has a molecular weight ranging from about 60,000 Daltons to about 100,000 Daltons. In an illustrative embodiment, the polysaccharide has a molecular weight of about 70,000 Daltons to about 100,000 Daltons, of about 80,000 Daltons to about 100,000 Daltons, of about 70,000 Daltons to about 90,000 Daltons, of about 80,000 Daltons to about 90,000 Daltons, of about 75,000 Daltons to about 85,000 Daltons, and of about 80,000 Daltons (i.e., 80,000 g/mol).

The polysaccharide binder is typically stable at a pH ranging from about 2 to about 11. The polysaccharide is also stable at a pH ranging from about 3 to about 10, from about 4 to about 9, from about 2 to about 10, from about 3 to about 9, from about 4 to about 8.5, from about 3 to about 8.5. A preferred pH ranges from about 5 to about 8.5.

The polysaccharide binder of the present invention comprises monosaccharide subunits linked by glycosidic bonds. The monosaccharide subunits of the polysaccharide binder may be selected from the group consisting of glucose, fructose, mannuronate, guluronate, or galacturonic acid, independently (e.g., homopolysaccharide or homoglycan) or in combinations thereof (e.g., heteropolysaccharide or heteroglycan). Illustrative polysaccharides of the instant edible coating comprise starch, starch derivatives, glycogen, pectin, alginate, cellulose, and cellulose derivatives. For example, preferred polysaccharide binders useful for the presently claimed edible coating are Hydroxypropylcellulose and Ethyl cellulose, and combinations thereof.

Hydroxypropylcellulose (HPC) and Ethyl cellulose (EC) are cellulose derivatives useful for the present invention and they are also commercially available. HPC and EC are used in numerous industries in the fields of plastics and pharmaceuticals. Additionally, HPC and EC are generally used in the food industry as thickening agents, stabilizers, or emulsifiers.

Hydroxypropylcellulose (HPC) is a polysaccharide molecule produced by reacting alkali cellulose with propylene oxide to produce a non-ionic, water-soluble, cellulose ether. HPC may also be in the form of a powder. Generally, HPC has the following chemical structure:

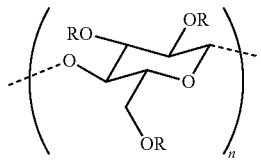

As shown above, the glucose subunit of the HPC molecule may be repeated n times, wherein n may range from several to many thousands, for example, from about 10 to about 3,000. Further, the glucose subunit of HPC comprises R, wherein R is a Hydrogen (H) or a $CH_2CH(OH)CH_3$ group.

Ethyl cellulose (EC) is produced by reacting alkali cellulose with ethyl chloride to produce a non-ionic polysaccharide molecule. EC of the present invention is a cellulose ether containing ethoxy ($OC_2H_5$) groups attached by an ether linkage and containing on an anhydrous base not more than about three ethoxy groups per anhydroglucose unit (e.g., from about 2.4 to about 2.7). Water sensitivity of EC decreases as the ethoxy content of EC increases. In contrast, the number of ethoxy groups on the glucose subunit (i.e., the degree of ethylation or the ethoxy group:glucose ratio) correlates with the solubility of EC.

For example, EC having an ethoxy group:glucose ratio ranging from about 0.5 to about 1 is typically soluble in aqueous alkali. Water solubility of EC is obtained when the ethoxy group:glucose ratio ranges from about 1.0 to about 1.5. Additionally, solubility in polar and nonpolar organic solvents is optimal when the ethoxy group:glucose ratio ranges from about 2.4 to about 2.7. Above this range, EC may not be soluble in polar organic solvents, such as ethyl alcohol, but will remain soluble in nonpolar organic solvents, such as toluene. Accordingly, the EC of the present disclosure is water-insoluble, but is soluble in many polar and nonpolar organic solvents, such as choloroform, ethyl alcohol, or toluene, or combinations thereof. EC may also be in the form of a powder.

EC has the general chemical structure as shown above for HPC. The glucose subunit of the EC molecule may be repeated n times, wherein n may range from several to many thousands, for example, from about 10 to about 3,000. Further, the glucose subunit of EC comprises R, wherein R is a Hydrogen (H) or an ethyl group ($CH_3CH_2$ or $CH_2CH_3$).

A polysaccharide binder described herein, such as HPC or EC, may be used in varying concentrations within the edible coating including between about 1% and about 30%, from about 1% to about 20%, from about 10% to about 20%, from about 5% to about 25%, from about 1% to about 10%, from about 1% to about 9%, from about 1% to about 7%, from about 1% to about 8%, %, from about 1% to about 6%, from about 1% to about 5%, from about 2% to about 8%, from about 2% to about 9%, from about 2% to about 7%, from about 2% to about 6%, from about 2% to about 5%, from about 1% to about 4%, from about 1.5% to about 3.5%, from about 1% to about 3%, from about 2% to about 5%, from about 2.5% to about 3.5%, and preferably from about 2% to about 4%.

About 70% to about 99% ethyl alcohol was added to the edible coating formulation based on the type of binder and total volume of the edible coating (see Table 1). In addition, ranges of ethyl alcohol used with the polysaccharide binder included about 75% to about 99%, from about 80% to about 99%, from about 90% to about 99%, from about 92% to about 99%, from about 94% to about 99%, from about 95% to about 99%, from about 95% to about 98%, from about 95% to about 97%, from about 96% to about 98%, from about 96% to about 99%, from about 95% to about 98%, from about 96% to about 98%, from about 96.5% to about 97.5%, and at about 97%.

An optional component of the edible coating described herein is a plasticizer. A plasticizer is a material incorporated in a biopolymer (e.g., a binder) to increase the workability, flexibility, and extensibility of the biopolymer. Plasticization involves intimate mixing and molecular compatibility, such that a plasticizer is homogenously blended in a polymer or a polymer in a plasticizer. While the edible coating of the present disclosure may or may not include a plasticizer, plasticizers which may be used in the present disclosure include Propylene Glycol, Sorbitol, Stearic Acid, Glycerol, and Acetylated Monoglycerides (AcMG). However, any appropriate plasticizer may be used in an amount (within regulatory guidelines) that provides the desirable properties to the edible coating.

The appropriate type and amount of plasticizer may be selected to (i) improve flexibility of the edible coating during freezing and thawing and/or (ii) provide a desirable decrease in the viscosity of the coating prior to application. Additional factors that are useful to determine the desired amount of plasticizer in an edible coating include (i) amounts of other components of the edible coating (i.e., alcohol), (ii) the temperature fluctuation experienced during production and storage, and (iii) the coating application method employed. While use of a plasticizer may provide such advantages to some embodiments disclosed herein, not all embodiments of the present edible coating require the addition of a plasticizer.

The edible coating comprising Hydroxypropylcellulose (HPC) or Ethyl cellulose (EC) polysaccharide binder, as described herein, does not require a plasticizer. The high level of hydroxypropoxyl or ethoxyl substitution of HPC or EC, respectively, creates a plasticizing effect that results in a coating of low tensile strength. As such, HPC and EC are particularly suitable binders for injection, extrusion, and/or spraying an edible coating of the present invention onto frozen bakery products without requiring the addition of plasticizers.

An edible coating of this disclosure contains an amount of plasticizer from about 0% to about 10% based on the type of binder and the total amount of edible coating produced (see Table 1). More specifically, the amount of plasticizer may be between about 1% to about 10%, from about 0% to about 5%, from about 1% to about 5%, from about 0% to about 1%, from about 5% to about 10%, from about 2% to about 6%, from about 0% to about 1%, from about 0.5% to about 1%, from about 0% to about 0.5%, from about 0% to about 0.3%, from about 0% to about 0.15%, and at about 0% (see Table 1).

A preferred edible coating may also be formulated by combining about 3% Hydroxypropylcellulose (HPC), Ethyl Cellulose (EC), or combinations thereof and about 97% alcohol with no plasticizer, as listed in Table 1. The coating composition is prepared according to the method described in Table 2.

Initially, the appropriate amount of alcohol was added to the polysaccharide binder to make a solution and decrease the viscosity (Table 2). Optionally, solid plasticizer was melted to liquefy and then scaled to about 10% of the binder-alcohol composition. If added, the plasticizer was then blended into the binder-alcohol composition with a high sheer blender to mix thoroughly and homogenously. Otherwise, the HPC or EC binder-alcohol composition (without plasticizer) was blended with a high sheer blender to mix thoroughly and homogenously.

Edible coatings may be applied to the surface of frosted bakery products in an amount and manner to satisfy the desired purpose and may require coverage of an entire frosted bakery product or only a portion of a surface (e.g., the top surface). Factors to consider when determining the amount of edible coating to be applied to a surface of a frosted bakery product include the composition of the edible coating, including the use of a specific type and amount of plasticizer, the type of bakery product (e.g., doughnuts, pastries, brownies, cakes, etc.), the type of frosting (e.g., icing, buttercreme, glaze, etc.), the atmospheric conditions during production and storage of the bakery product, and the specific quality attributes desired in the finished product.

While it should be understood that the invention disclosed herein may be used with any frozen bakery product which will benefit from the contents of this disclosure the following example describes a method of applying the edible coating to doughnuts as an illustrative example. Generally there are two basic types of doughnuts: yeast doughnuts and cake doughnuts. Typically the process for making cake doughnuts includes dropping the batter from a depositor directly into hot frying fat via a set of nozzles or plungers. The nozzles shape the batter as it passes therethrough. The cake doughnuts are then fried in the fry fat for about two minutes whereupon a conveyor carries them out of the vat to be frosted. After being frosted, the cake doughnuts are cooled and then frozen and packaged for distribution.

An Old-Fashioned Cake Doughnut is an illustrative example of a cake doughnut bakery substrate of the present invention. An Old-Fashioned Cake Doughnut is roughly round, with a hole in the middle and has a flower petal cracked appearance. An Old-Fashioned Cake Doughnut may be prepared by combining ingredients in Table 3 within the ranges listed in Table 3A. Addition of water to the cake doughnut mix as described in Table 3B, is followed by frying the bakery product at a temperature of about 176° C. to about 199° C. for about 1 minute to about 2 minutes each side. As described herein, an Old-Fashioned Cake Doughnut may be an old-fashioned cake doughnut that is glazed or unglazed.

After frying, the cake doughnuts were frosted using the formulation described in Table 4. The frosting formulation may be prepared by combining ingredients within the ranges listed in Table 4 and preparing the frosting, as described in Table 5, to produce a Glazed Old-Fashioned Cake Doughnut used for later testing of the presently claimed edible food coating. The Glazed Old-Fashioned Cake Doughnut was then cooled down to room temperature of about 16° C. to about 21° C. for about 30 minutes to about 40 minutes.

One procedure for making yeast doughnuts includes using a dough mixer to develop the dough. Once developed the dough is removed from the mixer and placed into the extruder. After extrusion the dough is placed on another conveyor belt where a series of rollers flatten it into a sheet having the desired thickness. The sheet is then advanced to a rotating cylinder that cuts the dough into appropriate shape of the substrate. Thereafter a retractable arm drops the cut pieces of dough onto wire mesh trays. The mesh trays then transport the cut pieces into a proofer. The heat and humidity in the proofer makes the yeast dough rise. After the leavening process the dough is fried for about two minutes. After frying the doughnut is passed through a curtain of frosting (e.g. glaze) to produce the final product. After being frosted the doughnuts are cooled and then frozen and packaged for distribution.

A Glazed Yeast Doughnut and Chocolate-Frosted Yeast Doughnut are illustrative examples of a yeast doughnut bakery substrate of the present invention. A yeast doughnut may be prepared by combining ingredients in Table 6 within the ranges listed in Table 6A. Addition of water to the yeast doughnut mix, as described in Table 6B, follows. The yeast doughnuts are then fried at a temperature of about 176° C. to about 199° C. for about 1 minute to about 2 minutes on each side. After frying, the yeast doughnuts were frosted using the formulation described in Table 4 to form a Glazed Yeast Doughnut.

Chocolate frosting may be prepared by combining ingredients within the ranges listed in Table 4 and substituting a percentage of the sugar with cocoa powder and/or the flavoring with imitation chocolate or other chocolate flavoring. The chocolate frosting formulation may be prepared as described in Table 5. The resulting chocolate frosting may then be applied to a yeast doughnut described in Table 6 in order to produce a Chocolate-Frosted Yeast Doughnut used for subsequent testing of the edible food coating of the present disclosure. After frosting was added, the Chocolate-Frosted Yeast Doughnut was then cooled down to room temperature of about 16° C. to about 21° C. for about 30 minutes to about 40 minutes.

After cooling the doughnut, the edible coating was applied in an amount of about 0.05% to about 0.50% by total weight of the frosted bakery product (in this particular example a doughnut). An edible coating may be applied to a frosted bakery product by various methods including mechanically, dip casting, or spraying. Due to the reduced viscosity of the polysaccharide-based edible coating (without plasticizer) described herein, the use of a sprayer to efficiently apply a uniformly thin layer of coating over each frosted bakery product may be used. Upon spray application of the coating composition onto the doughnut, the edible coating is formed. Typically, an edible coating after being uniformly sprayed onto a frosted bakery product needs to dry immediately to achieve the desirable preservation of look and texture after thawing.

The coated frosted bakery product (i.e., a Glazed Old-Fashioned Cake Doughnut, a Chocolate-Frosted Yeast Doughnut, or a Glazed Yeast Doughnut in this example) was then quick frozen until it reached a core temperature from about −8° C. to about −20° C. and had a dwell time of about 15 minutes to about 45 minutes. The frozen coated frosted doughnut was packaged in a primary packaging (e.g., a window box or a clamshell), then in a secondary packaging (e.g., a cardboard master container), and finally stored at freezing conditions from about −10° C. to about −20° C. in a static freezer having 80% relative humidity for an indefinite period of time.

TABLE 1

EDIBLE COATING FORMULATION

| FORMULA INGREDIENTS | PART (%) | RANGE (%) |
|---|---|---|
| Binder (HPC or EC) | 3.0 | 1.0-30.0 |
| Plasticizer (Propylene Glycol, Sorbitol, Stearic Acid, or Acetylated Monoglycerides) | 0.0 | 0.0-10.0 |
| Ethyl Alcohol | 97.0 | 70.0-99.0 |
| TOTAL | 100.0 | |

TABLE 2

DIRECTIONS TO PREPARE EDIBLE COATING

1. Scale binder (i.e., HPC or EC). Add alcohol.
2. Optionally, Scale plasticizer.
3. Optionally, Add the composition of Step 2 to the composition of Step 1.
4. With a high sheer blender, mix the composition of Step 1 or Step 3 until it is homogeneously blended.

TABLE 3

CAKE DOUGHNUT FORMULATION

| DESCRIPTION | PART (%) | RANGE (%) |
|---|---|---|
| TABLE 3A. OLD FASHIONED CAKE DOUGHNUT DRY MIX | | |
| Emulsifiers: Soy Lecithin, Mono- and Diglycerides, PGME | 0.5 | 0.5-4.0 |
| Leavening Acids: SAPP 43, 40, 37, 28, BL60 | 1.0 | 0.5-4.0 |
| Salt | 1.0 | 0.5-2.5 |
| Granulated Sugar | 27.0 | 15.0-35.0 |
| Egg Yolk Solids | 2.0 | 0.5-4.0 |
| Soy Flour | 1.5 | |
| Flavors: Vanilla and Butter | 0.4 | |
| Fat: Soy Oil | 3.6 | 2.0-6.0 |
| Sodium Bicarbonate | 0.5 | |
| Pregel Starch | 1.5 | 0.5-4.0 |
| FD&C Colors | 0.0 | |
| Flour: Hard and Soft Wheat | 60.0 | 60.0-80.0 |
| Dairy Solids | 1.0 | 1.0-4.0 |
| Old Fashioned Cake Doughnut Mix | 100.0 | |
| TABLE 3B. OLD FASHIONED CAKE DOUGHNUT | | |
| Water | 25.0 | 15.0-30.0 |
| Cake Doughnut Mix | 55.0 | 40.0-70.0 |
| Fry Shortening | 20.0 | 15.0-30.0 |
| Old Fashioned Cake Doughnut | 100.0 | |

TABLE 4

FROSTING FORMULATION

| FORMULA INGREDIENTS | PART (%) | RANGE (%) |
|---|---|---|
| Water | 19.0 | 10.0-40.0 |
| Sugar: Granulated, Powdered, Fondant | 70.0 | 50.0-90.0 |
| Frosting Stabilizer | 2.0 | 0.5-5.0 |
| Fat: Hard Fat flakes and All Purpose | 5.5 | 1.0-6.0 |
| Maltodextrin | 3.0 | 0.0-15.0 |
| Flavor: Vanilla, Butter, Lemon | 0.5 | 0.0-0.5 |
| TOTAL: | 100.0 | |

TABLE 5

DIRECTIONS TO PREPARE FROSTING

1. Scale Water.
2. Scale granulated sugar and stabilizer. Pre-blend them.
3. Scale powdered sugar, maltodextrin, and flavor. Pre-blend them.
4. Scale shortening, hard fat flakes, and fondant.
5. Blend the composition created in Step 1 to the composition created in Step 2 until the sugar dissolves.
6. Heat until there is a rolling boil.
7. Add the composition created in Step 4 to the syrup and mix until all the ingredients are dissolved.
8. Mix in the "dual speed mixer" the composition from Step 3 with the final syrup obtained in Step 7 with torque in high power range for Steps 9 and 10.
9. Add half of the composition from Step 3 and mix at 1000 rpm for two minutes.
10. Add the rest of the composition from Step 3 and mix at 1400 rpm for two minutes.
11. Measure the soluble solids, water activity, viscosity, and temperature.

TABLE 6

YEAST DOUGHNUT SUBSTRATE FORMULATION

| DESCRIPTION | PART (%) | RANGE (%) |
|---|---|---|
| TABLE 6A. YEAST DOUGHNUT SUBSTRATE MIX | | |
| EMULSIFIERS: MONO- AND DIGLYCERIDES, SSL | 1.3 | 0.5-4.0 |
| LEAVENING ACIDS: SAPP 43, 40, 37, 28 | 0.6 | |
| SALT | 1.2 | 0.5-2.5 |
| FLOUR: HARD AND SOFT WHEAT | 82.0 | 70.0-87.0 |
| SUGAR: DEXTROSE | 4.9 | 4.0-8.0 |
| SOY FLOUR | 1.0 | |
| FLAVORS: VANILLA AND BUTTER | 0.1 | |
| FAT: SOY OIL | 5.7 | 5.0-10.0 |
| SODIUM BICARBONATE | 0.5 | |
| FD & C COLORS | 0.0 | |
| DAIRY SOLIDS | 0.7 | 0.5-4.0 |
| POTATO FLOUR | 2.0 | |
| YEAST DOUGHNUT MIX | 100.0 | |
| TABLE 6B. YEAST DOUGHNUT SUBSTRATE DOUGH | | |
| WATER | 33.5 | 20.0-40.0 |
| YEAST DOUGHNUT MIX | 64.4 | |
| YEAST | 2.1 | 2.0-4.0 |
| YEAST DOUGHNUT DOUGH | 100.0 | |

ILLUSTRATIVE EXAMPLES

To test the effect of the edible coating on frosted bakery products, Glazed Old Fashioned Cake Doughnuts, Chocolate-Frosted Yeast Doughnuts, and Glazed Yeast Doughnuts (hereinafter referred to as "doughnuts") were prepared as described in Tables 3 and 6, respectively. Prior to freezing, frosted doughnuts of Example 1 where coated with four test coatings and visually compared for sensory ratings. In Example 2, the frosted doughnuts were covered with different coatings. Finally, in Example 3, the coated, frosted doughnuts of Example 2 were frozen and thawed to test the performance of the coatings after a freeze/thaw cycle via a sensory evaluation.

Example 1

This example demonstrates the effect of the coating on the doughnuts after freezing and thawing. Prior to freezing, select Glazed Yeast Doughnuts and Glazed Old-Fashioned Cake Doughnuts were layered with one of the test coatings formulated with variable types and concentrations of binder (i.e., polysaccharide) and alcohol, as described in Table 7.

TABLE 7

TEST COATING COMPOSITIONS (EXAMPLE 1)

| Test # | Binder | Plasticizer | Alcohol | Comments |
|---|---|---|---|---|
| 1 | HPC | N/A | Ethyl Alcohol | |
| 2 | N/A | N/A | N/A | NEGATIVE CONTROL |
| 3 | EC | N/A | Ethyl Alcohol | |
| 4 | Confectioner's Glaze | Acetylated Monoglycerides | Ethyl Alcohol | |

After freezing indefinitely and subsequently thawing for zero hours and for about 3 to 10 hours, respectively, for example, for about 3 to about 8 hours, for about 3 to about 7 hours, for about 4 to about 6 hours, for about 3 to about 6 hours, for about 3 to about 5 hours, for about 4 to about 10 hours, for about 4 to about 9 hours, for about 4 to about 8 hours, for about 4 to about 7 hours, for about 5 to about 10 hours, for about 5 to about 9 hours, for about 5 to about 8 hours, for about 5 to about 7 hours, for about 5 to about 6 hour, for about 5.5 or for about 5 hours, the test coatings on the doughnuts were visually inspected for surface blemishes, namely cracks and condensation (see Table 8 below). In addition, the test coatings were also inspected for textural surface changes, such as stickiness and gloss (see Table 8 below). Flavor and smell were additional sensory parameters that were evaluated for the test coatings (see Table 8 below).

TABLE 8

TEST COATING COMPOSITION RESULTS FOR GLAZED YEAST DOUGHNUTS (EXAMPLE 1)

| Test # | Stickiness 1-Driest 10-Wettest | Gloss 1-Least Gloss 10-Most Gloss | Cracks 1-Least Cracking 10-Most Cracking | Smell 1-Typical Bakery Good 10-Not Typical Good | Flavor 1-No Off Notes 10-Off Notes |
|---|---|---|---|---|---|
| TABLE 8A. ZERO HOURS | | | | | |
| 1 | 1 | 7 | 1 | N/A | N/A |
| 2 | 10 | 10 | N/A | N/A | N/A |
| 3 | 1 | 8 | 1 | N/A | N/A |
| 4 | 1 | 5 | 4-5 | N/A | N/A |
| TABLE 8B. ABOUT FIVE HOURS | | | | | |
| 1 | 1 | 7 | 1 | 1 | 1 |
| 2 | 1 | 3 | N/A | 1 | 1 |
| 3 | 1 | 8 | 1 | 1 | 1 |
| 4 | 1 | 5 | 4-5 | 5 | 3 |

Test coatings #1 and #3 contained no plasticizer, but comprised 97% alcohol with the HPC or EC polysaccharide binders, respectively. When applied to Glazed Yeast Doughnuts, test coatings #1 and #3 presented no cracking (i.e., rating of 1) at zero and about five hours (see Table 8). In addition, test coatings #1 and #3 substantially improved gloss of the doughnut. In fact, test coating #1 and #3 had a gloss rating of 7 and 8, respectively, at zero and about five hours which was an improvement over the negative control which had a gloss rating of 10 at zero hours and a gloss rating of 3 at about five hours. As such, test coatings #1 and #3 comprising the HPC and EC binders, respectively, were determined to perform well, since they presented no cracks and the highest gloss on the Glazed Yeast Doughnuts that was retained over time.

TABLE 9

TEST COATING COMPOSITION RESULTS FOR GLAZED OLD-FASHIONED DOUGHNUTS (EXAMPLE 1)

| Test # | Stickiness 1-Driest 10-Wettest | Gloss 1-Least Gloss 10-Most Gloss | Cracks 1-Least Cracking 10-Most Cracking | Smell 1-Typical Bakery Good 10-Not Typical Good | Flavor 1-No Off Notes 10-Off Notes |
|---|---|---|---|---|---|
| TABLE 9A. ZERO HOURS | | | | | |
| 1 | 1 | 5 | 1 | N/A | N/A |
| 2 | 1 | 9 | N/A | N/A | N/A |
| 3 | 1 | 8 | 1 | N/A | N/A |
| 4 | 1 | 6 | 4-5 | N/A | N/A |

TABLE 9-continued

TEST COATING COMPOSITION RESULTS FOR GLAZED
OLD-FASHIONED DOUGHNUTS (EXAMPLE 1)

| Test # | Stickiness 1-Driest 10-Wettest | Gloss 1-Least Gloss 10-Most Gloss | Cracks 1-Least Cracking 10-Most Cracking | Smell 1-Typical Bakery Good 10-Not Typical Good | Flavor 1-No Off Notes 10-Off Notes |
|---|---|---|---|---|---|
| TABLE 9B. ABOUT FIVE HOURS | | | | | |
| 1 | 1 | 6 | 1 | 1 | 1 |
| 2 | 1 | 1 | N/A | 1 | 1 |
| 3 | 1 | 9 | 1 | 1 | 1 |
| 4 | 1 | 6 | 4-5 | 5 | 3 |

When applied to Glazed Old-Fashioned Cake Doughnuts, test coatings #1 and #3 presented no degree of observed cracking with a cracks rating of 1 at zero and about five hours (see Table 9). In addition, test coatings #1 and #3 substantially improved gloss of the doughnut. In fact, test coating #1 had a gloss rating of 5 at zero hours which improved to a gloss rating of 6 at about five hours. Test coating #3 had a gloss rating of 8 at zero hours which improved to a gloss rating of 9 at about five hours. Thus, both test coatings #1 and #3 showed an improvement of gloss over time which was a significant improvement over the negative control which had a gloss rating of 9 at zero hours that decreased to a gloss rating of 1 at and five hours.

Additionally, neither test coating #1 nor #3 showed any cracks in the frosting at about five hours (i.e., crack rating of 1), were relatively dry (i.e., stickiness rating of 1), and did not possess off notes (i.e., flavor rating of 1). In contrast, test coating #4 containing the Confectioner's glaze did show cracks in the frosting at about five hours (i.e., crack rating of 4-5), was also dry (i.e., stickiness rating of 1), but did exhibit some off notes and suboptimal smells (i.e., flavor rating of 3 and smell rating of 5). As such, test coatings #1 and #3 comprising the HPC and EC binders, respectively, were determined to perform well, since they presented no cracks and the highest gloss on the Glazed Old-Fashioned Cake Doughnuts.

Example 2

This example demonstrates the superior performance of an edible coating with reduced viscosity, as described herein, when applied onto frosted doughnuts using a sprayer. Two formulations of the edible coating were tested. A test coating comprising 3% Hydroxypropylcellulose (HPC) and 97% alcohol of the total of the coating composition was prepared. A test coating comprising 3% Ethyl cellulose (EC) and 97% alcohol of the total of the coating composition was also prepared. Each formulation had a viscosity of about 14 cPs. No plasticizer was used in the HPC or EC coatings.

In addition, solids of the food coating correspond to the polymeric material of the food coating. For example, a food coating comprising 3% of HPC or EC has a 3% concentration of solids. The viscosity of the food coating described herein is also positively correlated with the concentration of solids comprised within the coating. The more solids comprised in the food coating, the higher the viscosity of the food coating. For example, a food coating comprising 1% of solids (e.g., HPC or EC) will have a lower viscosity than a food coating comprising 3% of solids. Whereas, a food coating comprising 4% of solids (e.g., HPC or EC) will have a higher viscosity than a food coating comprising 2% of solids.

Solids were measured for the edible food coating formulations described herein. Solid content of the instant food coating, namely the HPC and EC polysaccharide contents of the coating, may range from about 1% to about 4%. More specifically, the solids may range from about 1% to about 3.5%, from about 1.5% to about 4%, from about 1.5% to about 3.5%, from about 1.5% to about 3%, from about 2% to about 4%, from about 2.5% to about 3.5%, from about 2.7% to about 3.3%, from about 2.8% to about 3.2%, from about 2.9% to about 3.1%, and at about 3%.

Frosted doughnuts (i.e., Glazed Old-Fashioned Cake Doughnuts, Chocolate-Frosted Yeast Doughnuts, and Glazed Yeast Doughnuts) were aligned to Spray System Equipment in preparation for application of the test coating formulations. An example of a spray system which can be utilized in the present invention comprises four ultrasonic nozzles in a 2×2 configuration where two nozzles are positioned in front of the spray deck and two nozzles are in back of the spray deck. The nozzle configuration was adjusted to allow the widest spray pattern when applying the coating onto the doughnuts. An example, of ultrasonic nozzles which can be utilized in the application of the coating are ultrasonic 25 kHz impact nozzles available from the Sono-Tek Corporation located at 2012 Route 9W Milton, N.Y. 12547. The spray conditions were as follows:

| SPRAY CONDITIONS | |
|---|---|
| Flow rate Box 1 and Box 2 (ml/min) | 50 |
| Jet Force Box 1 and Box 2 (LPM) | 55 |
| Nozzle power (Watts) | 10 |
| Jet Position from tip to donut (in) | 6 |
| Spray On (in) | 1 |
| Spray Off (in) | 20 |

Despite the lack of plasticizer, the HPC and EC coatings performed well on the spray equipment due to their low viscosities. The low viscosity of the HPC and EC coatings is thought to be a function of the increased extensibility and flexibility observed for the HPC and EC binders. The HPC and EC coatings also showed additional benefits as they were easy to use, to clean up, and sprayed evenly on the bakery substrates.

Example 3

This example demonstrates the improved organoleptic qualities of post-thawed, frosted doughnuts (i.e., Glazed Old-Fashioned Cake Doughnuts and Chocolate-Frosted Yeast Doughnuts) when sprayed with an edible food coating of the present invention prior to freezing. The instant food coating may or may not contain plasticizer. After spraying select doughnuts with the HPC coating without plasticizer or not at all (negative control) as described in Example 2, the doughnuts were further tested for appearance and taste qualities via a sensory evaluation.

The HPC-coated and the uncoated Control doughnuts undergoing the sensory evaluation were quick frozen in a blast or quick freezer for about 15 to about 45 minutes, then packaged and held for 2 weeks in a static freezer having temperatures ranging from about −10° C. to about −20° C. and an 80% relative humidity. The doughnuts were then thawed and tested at zero (0) hours, five (5) hours, and 22 hours in a holding room having ambient temperatures ranging from about 20° C. to about 25° C., but preferably at about 22° C., and a relative humidity ranging from about 55% to about 75%, but preferably at a humidity of about 58%. After the designated holding times, select doughnuts from each test coating group were observed for the following parameters; shine, stickiness, film, flavor, condensation, and appearance (see Tables 10-12 below).

As shown in Table 10, at zero (0) hours while the doughnuts were still frozen, the Control doughnut had the highest gloss (i.e., gloss rating of 10). In addition, at zero (0) hours, the Control doughnut had no observation of any off notes flavors (i.e., flavor rating of 1) or odors. Additionally, no condensation was observed on the Control doughnuts eight minutes after being removed from the freezer.

coating had significant adhesion to the bakery substrate (i.e., film rating of 10) as compared to the Control doughnut.

At 22 hours (see Table 12), significant moisture loss from the uncoated Control doughnut was observed resulting in a further reduction of gloss in the Control doughnut (i.e., gloss rating of 1). The HPC-coated doughnut had also experienced a reduction of its gloss at 22 hours resulting in a rating of 7. Neither doughnut had presented any cracks by the 22 hour time point and the stickiness, film, condensation, and flavor for both the Control and HPC coatings were comparable to that observed at the 0 hour and/or 5 hour time points.

TABLE 10

SENSORY EVALUATION RESULTS FOR HPC COATING - 0 HOUR (EXAMPLE 3)

| Coating | Gloss<br>1 - least gloss<br>10 - most gloss | Stickiness<br>1 - driest<br>10 - wettest | Film<br>Frozen State<br>Score Not<br>Applicable | Flavor<br>1 - no off notes<br>10 - off notes | Condensation<br>P-Present<br>NP-Not<br>Present | Appearance<br>1 - least Shrinking<br>or Cracking<br>10 - most Shrinking<br>or Cracking |
|---|---|---|---|---|---|---|
| Control | 10 | 1 | N/A | 1 | NP | N/A |
| HPC | 7 | 1 | N/A | 1 | NP | N/A |

TABLE 11

SENSORY EVALUATION RESULTS FOR HPC COATING - 5 HOUR (EXAMPLE 3)

| Coating | Gloss<br>1 - least gloss<br>10 - most gloss | Stickiness<br>1 - driest<br>10 - wettest | Film<br>1 - Least Adhesion<br>10 - Most Adhesion | Flavor<br>1 - no off notes<br>10 - off notes | Condensation<br>P-Present<br>NP-Not<br>Present | Appearance<br>1 - least Shrinking<br>or Cracking<br>10 - most shrinking<br>or cracking |
|---|---|---|---|---|---|---|
| Control | 3 | 1 | N/A | 1 | NP | 1 |
| HPC | 9 | 1 | 10 | 1 | NP | 1 |

TABLE 12

SENSORY EVALUATION RESULTS FOR HPC COATING - 22 HOUR (EXAMPLE 3)

| Coating | Gloss<br>1 - least gloss<br>10 - most gloss | Stickiness<br>1 - driest<br>10 - wettest | Film<br>1 - Least Adhesion<br>10 - Most Adhesion | Flavor<br>1 - no off notes<br>10 - off notes | Condensation<br>P-Present<br>NP-Not<br>Present | Appearance<br>1 - least Shrinking<br>or Cracking<br>10 - most shrinking<br>or cracking |
|---|---|---|---|---|---|---|
| Control | 1 | 1 | N/A | 1 | NP | 1 |
| HPC | 7 | 1 | 10 | 1 | NP | 1 |

The HPC coating had lower levels of gloss (i.e., gloss rating of 7) than the Control coating at zero (0) hours, and similar low levels of stickiness to the touch (i.e., stickiness rating of 1). No condensation was observed on the HPC-coated frosting eight minutes after being removed from the freezer. The flavor of the HPC doughnuts was retained and there was no observation of any off notes flavors (i.e., flavor rating of 1) or odors.

At five hours (see Table 11), both the Control and the HPC-coated doughnuts had retained similar sensory qualities as observed at the zero (0) hour time point and neither doughnuts had presented any cracks. However, it was observed at the five (5) hour time point that the glossiness of the HPC coating increased to a rating of 9 and was significantly higher than the gloss of the Control test coating which had decreased to a gloss rating of 3. Additionally, the HPC The HPC coating showed enhanced spraying and freeze/thaw performance on frozen bakery products as compared to the Control coating. In addition, it was observed that the HPC coating performed particularly well on the Chocolate-Frosted Yeast Doughnuts versus the glazed, cake doughnuts (i.e., Glazed Old-Fashioned Cake Doughnuts). The superior performance of the HPC coating on the frosted doughnuts after freezing and thawing is attributed to the low viscosity in that coating which provides the necessary elasticity to resist low freezing temperatures without cracking.

As such, HPC coatings of the present invention comprise coatings with a viscosity ranging from about 10 cPs to about 20 cPs, from about 12 cPs to about 20 cPs, from about 10 cPs to about 17 cPs, from about 11 cPs to about 17 cPs, from about 12 cPs to about 16 cPs, from about 12 cPs to about 15 cPs, from about 12.5 cPs to about 14 cPs, from about 12.5 cPs to about 14.5 cPs, from about 11 cPs to about 15 cPs, from about 10 cPs to about 15 cPs, from about 11 cPs to about 14 cPs, from about 12 cPs to about 14.5 cPs, and preferably from about 13.5 cPs to about 14.5 cPs. Ultimately, the reduced viscosity of the edible coating enables more clean and efficient spraying onto bakery substrates.

Example 4

This example demonstrates the improved organoleptic qualities of post-thawed, frosted doughnuts (i.e., Glazed Old-Fashioned Cake Doughnuts and Glazed Yeast Doughnuts) when sprayed with an edible food coating of the present invention prior to freezing. The instant food coating may or may not contain plasticizer. After spraying select doughnuts with the EC coating without plasticizer or not at all (negative control) as described in Example 2, the doughnuts were further tested for appearance and taste qualities via a sensory evaluation.

The EC-coated and the uncoated Control doughnuts undergoing the sensory evaluation were quick frozen in a blast or quick freezer for about 15 to about 45 minutes, then packaged and held for 2 weeks in a static freezer having temperatures ranging from about −10° C. to about −20° C. and an 80% relative humidity. The doughnuts were then thawed and tested at 24 hours and 48 hours in a holding room having ambient temperatures ranging from about 20° C. to about 25° C., but preferably at about 22° C., and a relative humidity ranging from about 55% to about 75%, but preferably at a humidity of about 58%. After the designated holding times, select doughnuts from each test coating group were observed for the following parameters; shine/gloss, stickiness, film, flavor, condensation, appearance, smell, and freshness (see Tables 13 and 14 below).

As shown in Table 13, after 24 hours of the Glazed Yeast Doughnuts being frozen (see Table 13A), the doughnut with the EC coating had the highest gloss (i.e., gloss rating of 8), and it was not wet or sticky to touch (i.e., stickiness rating of 1). Compared to the EC-coated yeast doughnut, the Control yeast doughnut had a dulled frosting with a gloss rating of only 2 at 24 hours. In addition, the Control yeast doughnut experienced significant shrinkage (i.e., appearance rating of 10), while the EC-coated yeast doughnut had not (i.e., appearance rating of 1).

Additionally, at 48 hours (see Table 13B), both the Control and EC-coated yeast doughnuts had retained similar sensory qualities as observed at the 24 hour time point. However, the gloss on the Control doughnut was quite dull and decreased from 2 to 1 at 24 and 48 hour timepoints, respectively. Significant gloss reduction and some observed cracks in the Control doughnut were attributed to loss of freshness in the Control doughnut. In contrast, the high gloss rating of 8 for the EC-coated yeast doughnut remained unchanged at the 24 and 48 hour timepoints, respectively. Of particular interest, the EC-coated doughnut had still not presented any cracks by the 48 hour timepoint, although cracks were observed for the Control doughnut. Additionally, the EC coating had significant adhesion to the bakery substrate (i.e., film rating of 10) as compared to the Control doughnut. Otherwise, the stickiness, film, condensation, and flavor for both the Control and EC coatings were comparable to that observed at the 24 hour time point.

As shown in Table 14, after 24 hours of the Glazed Old-Fashioned Cake Doughnuts being frozen (see Table 14A), the doughnut with the EC coating had the highest gloss (i.e., gloss rating of 10), and it was not wet or sticky to touch (i.e., gloss rating of 1). In addition, at 24 hours, the Control cake doughnut had experienced significant shrinkage (i.e., appearance of 10), dulling of the frosting (i.e., gloss rating of 1), and cracks (i.e., appearance of 10), while the EC-coated cake doughnut had not.

The flavor of both the Control and EC-coated cake doughnuts was retained at a rating of 2 and 1, respectively, and there was no observation of any substantial off notes flavors or odors at 24 hours. In fact, the Control and EC-coated doughnuts exhibited sweet smells and flavors (e.g., vanilla) at the 24 hour timepoint. Additionally, both the Control and EC-coated cake doughnuts exhibited freshness ratings of 6 and 9, respectively. However at 48 hours, freshness for both the Control and EC-coated doughnut had dropped slightly to a rating of 5 and 8, respectively. Thus, it was observed that the EC-coated doughnut was softer over time as compared to the Control doughnut.

At 48 hours (see Table 14B), the Control cake doughnuts had retained similar sensory qualities for stickiness, film, condensation, and appearance as that observed at the 24 hour time point. For example, the gloss on the Control cake doughnut was quite dull and maintained a rating of 1 at 24 and 48 hour timepoints. Some cracks were also observed on the control doughnuts at both 24 hour and 48 hour timepoints. The observed cracks and reduction of gloss in the Control doughnut as compared to the EC-coated doughnut were attributed to loss of freshness in the Control doughnut which decreased from a freshness rating of 6 at 24 hours to a freshness rating of 5 at 48 hours. Additionally, some flavor off notes were detected in the Control doughnut at 24 hours while some not typically good smells were detected in the Control doughnut at 48 hours.

At 48 hours (see Table 14B), the EC-coated cake doughnuts had also retained similar sensory qualities as that observed at the 24 hour time point. For example, the stickiness, film, condensation, smell, and flavor for the EC coating was comparable to that observed at the 24 hour time point. In addition, the EC-coated doughnuts had not presented any cracks or hair lines at the 24 hour and the 48 hour timepoints. The EC coating also had significant adhesion to the bakery substrate (i.e., film rating of 10) at both timepoints as compared to the Control doughnut.

Of particular interest, the high gloss rating of the EC-coated cake doughnut decreased slightly from 10 to 9 at the 24 and 48 hour timepoints, respectively. The reduction of gloss in the EC-coated doughnut was attributed to loss of freshness which decreased from a rating of 9 at 24 hours to a freshness rating of 8 at 48 hours. However, the decreased freshness and gloss ratings of the EC-coating at 48 hours were still significantly improved over the gloss and freshness ratings of the Control doughnut at 48 hours (i.e., gloss rating of 1 and freshness rating of 5).

TABLE 13

SENSORY EVALUATION RESULTS FOR EC COATING ON GLAZED YEAST DOUGHNUTS (EXAMPLE 4)

| Coating | Gloss 1 - Least Gloss 10 - Most Gloss | Stickiness 1 - Driest 10 - Wettest | Film 1 - Least Adhesion 10 - Most Adhesion | Flavor 1 - No Off Notes 10 - Off Notes | Condensation P-Present NP-Not Present | Appearance 1 - Least Shrinking or Cracking or Dullness 10 - Most Shrinking or Cracking or Dullness | Smell 1 - Typical Bakery Good 10 - Not Typical Good | Freshness 1 - Least Fresh 10 - Freshest |
|---|---|---|---|---|---|---|---|---|
| TABLE 13A. 24 HOURS ||||||||||
| Control | 2 | 1 | N/A | 2 | NP | 10 | 1 | 7 |
| EC | 8 | 1 | 10 | 1 | NP | 1 | 1 | 8.5 |
| TABLE 13B. 48 HOURS ||||||||||
| Control | 1 | 1 | N/A | 1 | NP | 10 | 1 | 2 |
| EC | 8 | 1 | 10 | 1 | NP | 1 | 1 | 5 |

TABLE 14

SENSORY EVALUATION RESULTS FOR EC COATING ON GLAZED OLD-FASHIONED CAKE DOUGHNUTS (EXAMPLE 4)

| Coating | Gloss 1 - Least Gloss 10 - Most Gloss | Stickiness 1 - Driest 10 - Wettest | Film 1 - Least Adhesion 10 - Most Adhesion | Flavor 1 - No Off Notes 10 - Off Notes | Condensation P-Present NP-Not Present | Appearance 1 - Least Shrinking or Cracking or Dullness 10 - Most Shrinking or Cracking or Dullness | Smell 1 - Typical Bakery Good 10 - Not Typical Good | Freshness 1 - Least Fresh 10 - Freshest |
|---|---|---|---|---|---|---|---|---|
| TABLE 14A. 24 HOURS ||||||||||
| Control | 1 | 1 | N/A | 2 | NP | 10 | 1 | 6 |
| EC | 10 | 1 | 10 | 1 | NP | 1 | 1 | 9 |
| TABLE 14B. 48 HOURS ||||||||||
| Control | 1 | 1 | N/A | 1 | NP | 10 | 2 | 5 |
| EC | 9 | 1 | 10 | 1 | NP | 1 | 1 | 8 |

The EC coating also showed enhanced spraying and freeze/thaw performance on frozen bakery products as compared to the Control coating. Additionally, it was observed that the EC coating performed particularly well on the glazed, cake doughnuts (i.e., Glazed Old-Fashioned Cake Doughnuts) versus the Glazed Yeast Doughnuts. The superior performance of the EC coating on the frosted cake doughnuts after freezing and thawing is attributed to the low viscosity in that coating which provides the necessary elasticity to resist low freezing temperatures without cracking.

As such, EC coatings of the present invention comprise coatings with a viscosity ranging from about 10 cPs to about 20 cPs, from about 12 cPs to about 20 cPs, from about 10 cPs to about 17 cPs, from about 11 cPs to about 17 cPs, from about 12 cPs to about 16 cPs, from about 12 cPs to about 15 cPs, from about 12.5 cPs to about 14 cPs, from about 12.5 cPs to about 14.5 cPs, from about 11 cPs to about 15 cPs, from about 10 cPs to about 15 cPs, from about 11 cPs to about 14 cPs, from about 12 cPs to about 14.5 cPs, and preferably from about 13.5 cPs to about 14.5 cPs. Ultimately, the reduced viscosity of the edible coating enables more clean and efficient spraying onto bakery substrates.

These examples demonstrate that an edible coating containing HPC or EC and high levels of alcohol as described herein results in a composition with reduced viscosity. Efficient dissolution of the HPC or EC polymers in the ethyl alcohol of the coating composition may be a factor in the success of the present coating compositions. For example, evaporation of the alcohol from the coating composition enables formation of a film and good adhesion of the coating film onto the surface of the substrate (i.e., the doughnut).

The reduction in viscosity further improves the application of the edible coating (e.g., via a sprayer) and thus, enables more efficient, uniform, and conservative coverage to frosted bakery products, such as old-fashioned cake or yeast doughnuts. The edible coating also improves the flexibility and extensibility of the bakery product to endure different atmospheric conditions such as freezing and thawing during production and storage.

For example, when applied to a frosted bakery product, the edible coating with alcohol acts as a barrier to prevent moisture migration resulting in dehydration, rehydration, and visual imperfections such as, dullness, stickiness, chipping, and condensation, thus improving the aesthetic appeal of the frozen frosted bakery product. Ultimately, the edible coating described herein permits the bakery product to show a fresh, "ready-to-eat" appearance that will extend the shelf life and enhance the commercial value of the bakery products.

It is intended that the scope of the present methods be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. An edible food coating, consisting essentially of:
   a polymer that is from about 1% to about 10% of the edible coating, an organic solvent that is from about 80% to about 99% of the edible coating, and a low viscosity that ranges from about 12 cPs to about 16 cPs, wherein the edible food coating does not comprise a pigment, and wherein the low viscosity provides elasticity to the edible food coating to resist low freezing temperatures without cracking after freezing and thawing.

2. The edible food coating of claim 1, wherein the polymer is Hydroxypropylcellulose (HPC) or Ethyl cellulose (EC).

3. The edible food coating of claim 1, wherein the organic solvent is ethyl alcohol.

4. The edible food coating of claim 1, wherein the viscosity is about 14 cPs.

5. The edible food coating of claim 1, wherein the polymer is about 3% of the edible coating.

6. The edible food coating of claim 1, where the organic solvent is about 97% of the edible coating.

7. A doughnut, consisting essentially of
a substrate that includes flour, sugar, fat, and water,
a frosting in contact with the substrate, and
an edible coating in contact with the frosting,
wherein the edible coating comprises from about 1% to about 10% of a polymer, from about 80% to about 99% of an organic solvent, and a low viscosity that ranges from about 12 cPs to about 16 cPs, and
wherein the edible food coating does not comprise a pigment, and
wherein the low viscosity provides elasticity to the edible food coating to resist low freezing temperatures without cracking after freezing and thawing.

8. The doughnut of claim 7, wherein the polymer of the edible food coating is Hydroxypropylcellulose (HPC) or Ethyl cellulose (EC).

9. The doughnut of claim 7, wherein the organic solvent of the edible food coating is ethyl alcohol.

10. The doughnut of claim 7, wherein the viscosity of the edible food coating is about 14 cPs.

11. The doughnut of claim 7, wherein the polymer of the edible food coating is about 3% of the edible coating.

12. The doughnut of claim 7, where the organic solvent of the edible food coating is about 97% of the edible coating.

13. The doughnut of claim 7, wherein the doughnut is a cake doughnut.

14. The doughnut of claim 7, wherein the doughnut is a yeast doughnut.

15. The doughnut of claim 14, wherein the yeast doughnut is a chocolate-frosted yeast doughnut or a glazed yeast doughnut.

16. The doughnut of claim 13, wherein the cake doughnut is an old-fashioned cake doughnut.

17. A method of applying an edible food coating to a doughnut, the method consisting essentially of:
preparing an edible food coating comprising from about 1% to about 10% of a polymer, from about 80% to about 99% of an organic solvent, and a low viscosity that ranges from about 12 cPs to about 16 cPs,
wherein the edible food coating does not comprise a pigment, and
wherein the low viscosity provides elasticity to the edible food coating to resist low freezing temperatures without cracking after freezing and thawing, and
advancing the edible food coating through at least one nozzle so as to spray the edible food coating onto the doughnut.

18. The method of claim 17, wherein the at least one nozzle is an ultrasonic nozzle.

19. The method of claim 18, wherein the at least one ultrasonic nozzle is a 25 kHz impact nozzle.

20. The method of claim 19, wherein the method further includes (i) a Box 1 and a Box 2 flow rate of about 50 ml/min, (ii) a Box 1 and a Box 2 jet force of about 55 LPM, (iii) a nozzle power of about 10 watts, (iv) a jet position from tip to doughnut of about 6 inches, (v) a spray on of about 1 inch, and (vi) a spray off of about 20 inches.

21. The method of claim 17, wherein the polymer of the edible food coating is Hydroxypropylcellulose (HPC) or Ethyl cellulose (EC).

22. The method of claim 17, wherein the organic solvent of the edible food coating is ethyl alcohol.

23. The method of claim 17, wherein the viscosity of the edible food coating is about 14 cPs.

24. The method of claim 17, wherein the polymer of the edible food coating is about 3% of the edible coating.

25. The method of claim 17, where the organic solvent of the edible food coating is about 97% of the edible coating.

26. The method of claim 17, wherein the doughnut is a cake doughnut.

27. The method of claim 26, wherein the cake doughnut is an old-fashioned cake doughnut.

28. The method of claim 17, wherein the doughnut is a yeast doughnut.

29. The method of claim 28, wherein the yeast doughnut is a chocolate-frosted yeast doughnut or a glazed yeast doughnut.

30. A method of preparing a coated doughnut, the method consisting essentially of:
preparing an edible food coating, wherein the coating comprises from about 1% to about 10% of a polymer, from about 80% to about 99% of an organic solvent, and has a low viscosity that ranges from about 12 cPs to about 16 cPs,
wherein the edible food coating does not comprise a pigment, and
wherein the low viscosity provides elasticity to the edible food coating to resist low freezing temperatures without cracking after freezing and thawing,
passing the edible food coating through at least one spray nozzle so as to spray the edible food coating onto the food product to create a coated doughnut,
freezing the coated doughnut, and
storing the frozen coated doughnut for a period of time.

31. The method of claim 30, further comprising:
thawing the coated doughnut after the period of time.

32. The method of claim 30, wherein the freezing occurs at core temperatures from about −8° C. to about −20° C. and at a relative humidity of about 55% to about 85%.

33. The edible food coating of claim 30, wherein the polymer of the edible food coating is Hydroxypropylcellulose (HPC) or Ethyl cellulose (EC).

34. The method of claim 30, wherein the organic solvent of the edible food coating is ethyl alcohol.

35. The method of claim 30, wherein the viscosity of the edible food coating is about 14 cPs.

36. The method of claim 30, wherein the polymer of the edible food coating is about 3% of the edible coating.

37. The method of claim 30, wherein the organic solvent of the edible food coating is about 97% of the edible coating.

38. The method of claim 30, wherein the at least one nozzle is an ultrasonic nozzle.

39. The method of claim 38, wherein the at least one ultrasonic nozzle is a 25 kHz impact nozzle.

40. The method of claim 39, wherein the method further includes (i) a Box 1 and a Box 2 flow rate of about 50 ml/min, (ii) a Box 1 and a Box 2 jet force of about 55 LPM, (iii) a nozzle power of about 10 watts, (iv) a jet position from tip to doughnut of about 6 inches, (v) a spray on of about 1 inch, and (vi) a spray off of about 20 inches.

41. The method of claim 30, wherein the doughnut is a cake doughnut.

42. The method of claim 41, wherein the cake doughnut is an old-fashioned cake doughnut.

43. The method of claim 30, wherein the doughnut is a yeast doughnut.

44. The method of claim 43, wherein the yeast doughnut is a chocolate-frosted yeast doughnut or a glazed yeast doughnut.

\* \* \* \* \*